Figure 1:
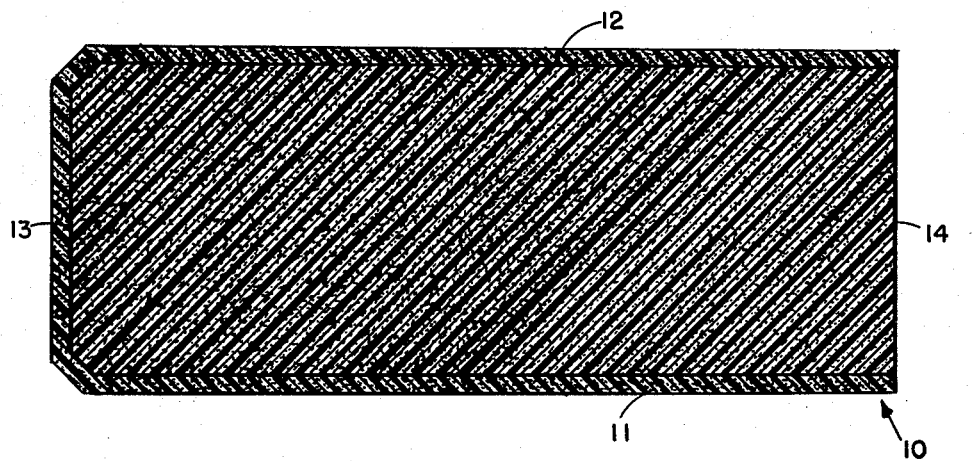

Nov. 1, 1960   W. E. CAMPBELL, JR., ET AL   2,958,288
PROPELLANT LINER
Filed Dec. 20, 1948

INVENTOR.
WILLIAM E. CAMPBELL JR.
LLOYD H. BROWN
BY
D. Gordon Angus
ATTORNEY 2,958,288
PROPELLANT LINER William E. Campbell, Jr., Pasadena, and Lloyd H. Brown, Altadena, Calif., assignors, by mesne assignments, to Aerojet-General Corporation, Cincinnati, Ohio, a corporation of Ohio Filed Dec. 20, 1948, Ser. No. 66,262

4 Claims. (Cl. 102—98)

This invention relates to propellants of the solid type used in rocket motors and in particular it relates to such propellants compounded from alkyd resin base materials.

The object of the invention is to provide a liner which will bond itself to the walls of such a propellant charge thereby preventing burning between the lining and the walls of the motor and confine the burning to the surfaces of the charge that are left uncovered by the liner.

It has been a common practice to form a solid propellant charge in the shape of a stick or grain and to insert the charge within the chamber of a rocket motor. This is done, for example, by casting the propellant into a suitable mold and causing it to become set. When such a grain or charge is placed within the chamber of the motor and ignited, burning would occur on both the sides and at the ends of the grain, if none of the surfaces were protected or restricted against burning. Such unrestricted burning on all surfaces would often be apt to create an uncontrolled burning, resulting in indeterminately high pressures, and this would subject the motor to possible explosions. To avoid such unrestricted and non-uniform burning a coating or liner has heretofore been bonded to the side of the propellant grain to heat insulate it and prevent access of the flames and hot gases to the otherwise combustible sides of the propellant charge. Propellant charges which are so coated are commonly referred to as "restricted" charges since the burning is confined to a restricted area or areas, normally one of the ends.

It has been found particularly desirable to use as a propellant charge a material having an alkyd resin base. For example, the charge may be compounded by suspending or dispersing an inorganic perchlorate, such as potassium or ammonium perchlorate, or other suitable oxidizer, in an alkyd resin matrix; and curing the resin. Such propellants are more fully disclosed in a pending application by Roy Roberts, Serial No. 647,189, filed February 12, 1946, now abandoned, and assigned to the same assignee as the present application.

In general, charges or grains containing an alkyd resin as a binder have not been as amenable as other types of grains, to the application of previously known types of liner, due to the fact that few materials appear satisfactorily to bond themselves to the surface of the cured alkyd resin. For this reason, the application of previously known types of liners to alkyd resin base propellants has not been as satisfactory as desired.

In accordance with our invention, we have discovered a coating which is suitable for lining alkyd resin base charges. This coating is one that is compounded from a mixture of alkyd resin-styrene into which there has been suspended or dispersed a suitable insert filler such as a clay, the preferred form of clay being bentonite. A catalyst should generally be aded to the alkyd resin portion of the liner to insure its polymerization under suitable conditions of temperature and pressure. Other fillers that may be employed are talc, diatomaceous earth, asbestos fiber and insert inorganic salts such as sodium sulfate, sodium carbonate, etc.

We prefer to apply the liner by dipping the propellant grain (of which its resin has already been properly polymerized) into the liner substance while the latter is in liquid form. Another way would be to brush or spray the liquid liner substance on the surface of the solid grain. The liner is then solidified by polymerizing it; for example, by subjecting it to a suitable polymerization temperature. After curing, such a liner has been found to possess physical properties which are substantially similar to those of the principal propellant charge, containing the perchlorate; this being due largely to the presence of the clay in the liner. Since the filler in the liner does not burn or possess any available oxygen, however, the presence of the filler in the liner actually retards the burning of the liner; a property which is particularly desirable in the case of restricted charges.

After the liner has been applied to the propellant grain, and subjected to a suitable temperature and cured, the liner possesses the advantage that it has suitable tensile strength over a very wide temperature range; down to as low as —30° F., and even lower, and up as high as 150° F. and above. This is thought to be due to the fact that the styrene in the uncured alkyd-resin-styrene mixture actually penetrates the cured propellant charge to some degree and tends to polymerize with the cured resin in the charge. This produces an unusually strong bond, which is more adherent than has usually been obtained by applying an ordinary thermoplastic liner to the cured grain.

A composition that has been found particularly satisfatory for lining a potassium or ammonium perchlorate-alkyd resin charge comprises: bentonite clay, approximately 45% by weight; and an alkyd resin containing styrene, 55% by weight. To this mixture there has been added a polymerization activator, namely a trace of tertiary butyl hydroperoxide, or other similar peroxides. The amount of tertiary butyl hydroperoxide may be varied depending upon the time in which it is desired to cause the alkyd resin mass to polymerize.

The alkyd resin most generally employed in a propellant grain of this type comprises the product resulting from the condensation of polyhydric alcohols with polycarboxylic acids; and the acid constituents generally comprise a mixture of a saturated organic dicarboxylic acid and an unsaturated organic dicarboxylic acid or anhydride such as fumaric acid or maleic anhydride. This is the type of alkyd resin which we prefer to use in the liner. The preferred form of alkyd resin is a condensation product comprising: 1 mole maleic anhydride, 4 moles of sebacic acid; and 5 moles of propylene glycol.

Another preferred form of the resin is one including styrene, which can be added to the alkyd resin in varying percentages and copolymerizes with it. A half and half mixture, by weight, of styrene and alkyd resin is quite satisfactory.

The preferred form of liner comprises a filler added to the resin in proportions such that the cured mixture will be of approximately the same specific gravity as that of the propellant composition it envelops, the difference being that the insert filler will replace the oxidizer.

However, the ratio of filler to the resin-styrene mixture may vary over a wide range of proportions as long as the percentage of the filler to the resin styrene mixture does not exceed 90% by weight of the resin-styrene, inert filler mixture.

Typical compositions which can be employed in lining the charge are ss follows:

| | Weight percent |
|---|---|
| Bentonite clay | 44.80 |
| Alkyd-resin-styrene mixture (50–50) | 54.70 |
| Tertiary butyl hydroperoxide | 0.50 |

This liner is rather slow in setting and may require a relatively long curing period. In case it is desired to decrease the curing time for the liner the following composition may be employed:

| | Weight percent |
|---|---|
| Bentonite clay | 44.80 |
| Alkyd-resin-styrene mixture (50–50) | 54.20 |
| Tertiary butyl hydroperoxide | 1.00 |

Figure 2:
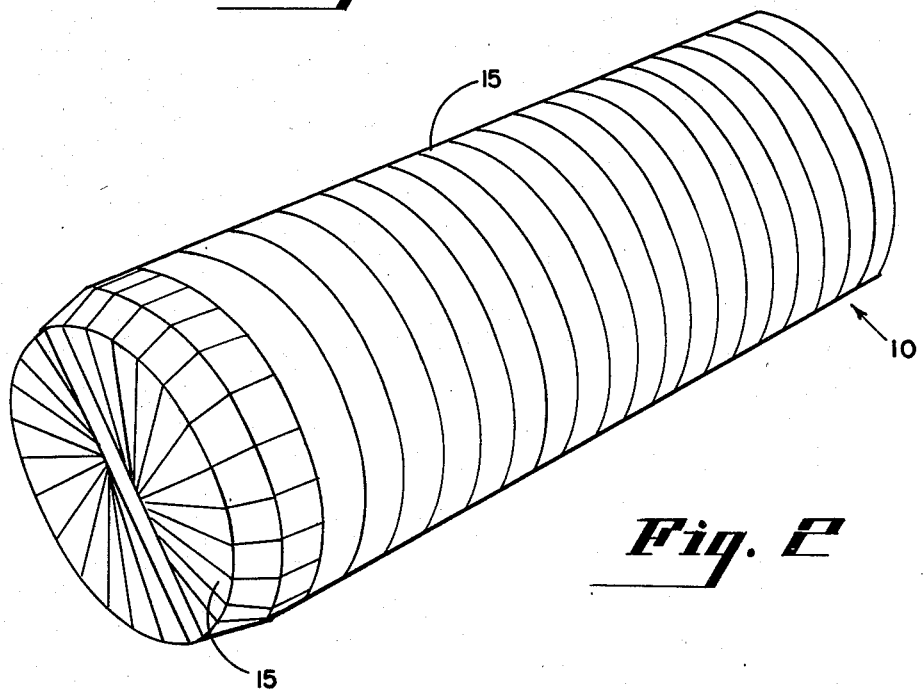

A physical embodiment of the invention is shown in the attached drawings in which:

Fig. 1 shows a longitudinal cross section view of a propellant charge with the restriction liner applied according to this invention; and Fig. 2 is a view showing the grain protected by a layer of tape.

Referring to Fig. 1, the propellant grain 10, comprising a homogeneous mixture of an alkyd resin and an inorganic perchlorate such as ammonium or potassium perchlorate, is provided with a coating 11 of alkyd resin and clay after the perchlorate-alkyd-resin charge has been polymerized. The liner 11 is applied to the side of the grain 12 and end 13, and the end 14 is left open for burning.

To protect the liner against damage caused by bumping or contact with hard surfaces a tape liner 15 is applied to the end 13 and spiralled up the sides 12 of the grain.

The liner can be applied to the propellant grain in the following manner:

A polymerized propellant grain is uniformly coated with a layer comprising a mixture of modified alkyd resin with the catalyst and clay. The layers are made as thick as desired, and after all the surfaces of the grain which require protection are coated, the grain is then placed in a heating medium and subjected to desired temperatures for the required time. The preferred temperature employed in carrying out our invention was 185° F. for a period of 48 hours. The grain is then removed from the oven and permitted to cool. At this point the grain may either be wrapped with a protecting liner or coated with some other suitable material, as shown in Fig. 2, to protect it from contacting hard or rough objects.

An important feature of the liner according to this invention is that it is capable of bonding itself intimately to the plastic material of the grain and often cannot be removed therefrom after polymerization without breaking off a portion of the propellant grain itself.

Furthermore, such a liner is impervious to the effect of hot gases since it is thermosetting and will remain in the reaction chamber when the motor is fired; and will burn much slower than the propellant grain, thereby insuring that the grain burns only on its unrestricted surface, which is the desired kind of restriction. This is a definite advantage over types of restriction which depend upon only an adherence to the surface of the grain for the restriction.

We claim:

1. A solid propellant charge having a polymerized polyester-styrene mixture having dispersed in it a solid inorganic oxidizer, and a liner adherent to a surface of said charge, said liner comprising a mixture of a polyester resin and styrene containing a uniformly distributed chemically inert filler, the resin in said liner being copolymerized to the surface of said propellant charge thereby forming a solid liner tenaciously adherent to the surface.

2. A solid propellant charge having a polymerized polyester-styrene mixture having dispersed in it a solid inorganic oxidizer, and a liner copolymerized to a surface of said charge, said liner comprising about 45% by weight of bentonite clay and about 55% by weight of a polyester resin containing styrene.

3. A propellant charge according to claim 2, in which the liner contains a polymerization activator.

4. A solid propellant charge according to claim 1 wherein said lined propellant charge is protected by a layer of tape.

References Cited in the file of this patent

UNITED STATES PATENTS

| 958,990 | Bourdelles | May 24, 1910 |
| 2,004,436 | Jaeger | June 11, 1935 |
| 2,363,569 | Caldwell et al. | Nov. 28, 1944 |
| 2,369,689 | Robie et al. | Feb. 20, 1945 |
| 2,375,701 | Smith | May 8, 1945 |
| 2,406,298 | King | Aug. 20, 1946 |
| 2,410,801 | Audrieth | Nov. 12, 1946 |
| 2,479,828 | Geckler | Aug. 23, 1949 |
| 2,514,141 | Phillips | July 4, 1950 |

OTHER REFERENCES

"Astronautics," of May 1932, page 6.